(12) United States Patent
Knox

(10) Patent No.: US 8,820,008 B2
(45) Date of Patent: Sep. 2, 2014

(54) LOAD BEAM ASSEMBLY FOR STORAGE UNIT

(71) Applicant: Howard T. Knox, Independence, KY (US)

(72) Inventor: Howard T. Knox, Independence, KY (US)

(73) Assignee: Ancra International LLC, Azusa, CA (US)

( * ) Notice: Subject to any disclaimer, the term of this patent is extended or adjusted under 35 U.S.C. 154(b) by 0 days.

(21) Appl. No.: 13/658,515

(22) Filed: Oct. 23, 2012

(65) Prior Publication Data

US 2014/0109494 A1 Apr. 24, 2014

(51) Int. Cl.
*E04D 13/18* (2014.01)

(52) U.S. Cl.
USPC .......................................... 52/173.1; 52/127.2

(58) Field of Classification Search
USPC ......... 52/173.1, 127.2, 846; 410/89, 143, 148
See application file for complete search history.

(56) References Cited

U.S. PATENT DOCUMENTS

| | | | | |
|---|---|---|---|---|
| 2,627,821 A | * | 2/1953 | Sjogren | 410/145 |
| 3,071,086 A | * | 1/1963 | Dunlap | 410/146 |
| 3,090,329 A | * | 5/1963 | Rolfe, Jr. | 410/148 |
| 4,079,677 A | * | 3/1978 | Vandergriff et al. | 410/147 |
| 5,338,137 A | * | 8/1994 | Jensen | 410/146 |
| 6,062,780 A | * | 5/2000 | Petelka | 410/89 |
| 6,074,143 A | * | 6/2000 | Langston et al. | 410/89 |
| 6,364,583 B1 | * | 4/2002 | Koller | 410/89 |

OTHER PUBLICATIONS

Kinedyne.com/products/127/k1-kaptive-beam-html;Apr. 27, 2012, pp. 1-5.

* cited by examiner

*Primary Examiner* — Basil Katcheves
(74) *Attorney, Agent, or Firm* — Brinks Gilson & Lione

(57) ABSTRACT

An elongate beam that supports an object in a storage space. The elongate beam has: i) a bottom wall with a downwardly facing surface; ii) a top wall having an upwardly facing surface and laterally spaced first and second side edges; and iii) laterally spaced first and second side walls with oppositely facing substantially flat surfaces. The top wall has lengthwise ends defined by edges and projects in cantilever fashion laterally beyond the flat surface on the first side wall to define a first flange with a first width between the flat surface of the first side wall and the first edge. The end edges do not extend orthogonally to a lengthwise center line for the top wall between the first and second side edges fully between the first and second side edges.

20 Claims, 6 Drawing Sheets

LOAD BEAM ASSEMBLY FOR STORAGE UNIT

BACKGROUND OF THE INVENTION

1. Field of the Invention

This invention relates to storage units, such as wheeled trailers and, more particularly, to a load beam assembly that is operably mounted within a space defined by such a storage unit to define a cargo support above a floor on the storage unit.

2. Background Art

It is known to utilize load beams in storage spaces in trailers on commercial vehicles to provide an additional support level for cargo between the floor and roof bounding such cargo spaces. An exemplary structure is shown in U.S. Pat. No. 6,364,583 (the '583 patent). The '583 patent discloses a load beam assembly of the type that is utilized in a commercial system identified by the owner herein as its "Lift-A-Deck" system.

With the load beam assembly in the '583 patent, substantial flexibility is afforded in terms of varying the height and front-to-rear location of one or more load beams. Cargo can be spanned directly across two or more of such load beams or, alternatively, elongate supporting components may bridge adjacent load beams to cooperatively produce a stable subjacent support surface for cargo. The latter arrangement potentially reduces the number of load beams that must be utilized and has particular utility for cargo with a smaller footprint and that which needs a more significant contact area to be stably supported in the space.

There are a number of objectives that guide designers of these load beams. Most significantly, the load beams must have adequate structural integrity so that they do not fail in what is often a demanding environment, particularly where the cargo is heavy. Over-the-road vehicles cause loaded cargo to be subjected to large forces that tend to cause shifting of the cargo. This shifting may cause cargo to be damaged or, in a worst case, interfere with vehicle operation. This problem is particularly prevalent in trailers that are only partially filled so that there is a substantial amount of empty space into which the cargo might shift.

It is also desirable to minimize the size of the load beams. Space in commercial vehicles is at a premium and it is thus important that this space be optimally utilized without sacrificing the integrity of the load beams.

Weight is also a significant consideration in the design of such load beams. Added weight translates into decreased fuel mileage. Reduced fuel mileage results in lost profit or necessitates raising of transportation rates, which has an obvious downside.

As noted above, designers must always balance the advantages associated with reducing size and weight against any compromising of structural integrity that results therefrom.

Another drawback with size reduction is that while size reduction may not ultimately significantly affect integrity, it may affect the operation of the load beams. For example, load beams narrowed to reduce dimension and weight may afford a significantly smaller contact area for supported cargo. There may be an increased risk that cargo may shift off of this reduced width load beam. Further, width reduction may occur to the point that the upper surfaces of the load beams cause a localized stress upon the underside of the cargo that they support, potentially causing either damage or inhibiting movement of the cargo during loading and/or loading thereof.

One devised design developed to address the above problems utilizes a "T"-shaped cross-sectional beam construction as shown in FIG. 5 in the '583 patent and also in EP 0 620 148 B1 ("EP '148").

In EP '148, the cross bar of the "T" defines an upwardly facing support surface that is rectangular in shape, as viewed in plan. This configuration produces sharp corners at the beam ends that might contact the individuals handling, or working around, the beams during: a) movement of the beams into and out of the storage spaces; b) setup of the beams within the storage spaces; and c) other handling of the beams, such as when they are otherwise moved or transported. These potentially sharp regions remain exposed with the beams operatively in place. Thus, there is an ongoing potential for those handling and working around the beams to be contacted, as during cargo loading and unloading, in a manner whereby there is the potential for injury.

Additionally, the exposed sharp regions produced by the beam configuration may cause damage to cargo that comes in contact with the beams as the cargo is loaded, unloaded, and potentially shifts once in a loaded state.

The industry continues to seek out designs of load beams that have excellent performance characteristics and integrity, while at the same time being relatively light in weight and of an unobtrusive size.

SUMMARY OF THE INVENTION

In one form, the invention is directed to the combination of: a) a storage unit consisting of a wall structure bounding a storage space and having a plurality of spaced supports; and b) a load beam assembly including: an elongate beam having a length between spaced first and second ends; a first connector for connecting the first end of the elongate beam to one of the spaced supports on the storage unit; and a second connector for connecting the second end of the elongate beam to another of the spaced supports on the storage unit. The elongate beam consists of: i) a top wall having an upwardly facing surface with a width between laterally spaced first and second edges extending generally parallel to the length of the elongate beam; and ii) a wall assembly below the top wall and having oppositely facing first and second surfaces. The upwardly facing surface has a lengthwise centerline between the first and second edges. The top wall extends in cantilever fashion away from the wall assembly to define a first flange extending to the first edge. The top wall has first and second lengthwise ends defined by third and fourth edges. The third edge has at least a first portion that does not extend orthogonally to the lengthwise centerline of the top wall between the first and second edges. The combination further includes at least one stored object supported on the upwardly facing surface.

In one form, the fourth edge has at least a second portion that does not extend orthogonally to the lengthwise centerline of the upwardly facing surface between the first and second edges.

In one form, the at least first portion is defined where the third edge extends away from one of the first and second edges.

In one form, the at least first portion is defined separately where the third edge extends away from each of the first and second edges.

In one form, a portion of the third edge extends orthogonally to the lengthwise centerline of the upwardly facing surface between the first and second edges over a distance between first and second points.

In one form, the at least first portion extends directly between the first edge and the first point.

In one form, the at least first portion extends directly between the second edge and the second point.

In one form, the at least first portion extending directly between the first edge and the first point is substantially straight.

In one form, the at least first portion extending directly between the second edge and second point is substantially straight.

In one form, the fourth edge has a portion that does not extend orthogonally to the lengthwise centerline between the first and second edges.

In one form, the storage unit is a wheeled trailer.

In one form, the one spaced support is an elongate first track and the first connector is a shoe that is guided by the first track and selectively fixable at different locations along the first track.

In one form, the elongate beam has a bottom wall with a downwardly facing surface with a width transversely to the length of the elongate beam. The width of the upwardly facing surface of the elongate beam is greater than the width of the downwardly facing surface of the elongate beam.

In one form, the top wall extends in cantilever fashion away from the wall assembly to define a second flange that extends to the second edge.

In one form, the elongate beam has telescopingly engaged first and second parts.

In one form, the elongate beam has a "T" shape as viewed in cross section transverse to the length of the elongate beam.

In one form, the first flange is locally thickened over a first width of the first flange and the first point is on the first flange where the first flange is locally thickened.

In one form, the fourth edge has at least a portion that does not extend orthogonally to the lengthwise centerline of the upwardly facing surface between the first and second edges.

In one form, the third and fourth edges have the same configuration.

In one form, the first edge is substantially straight and extends along a first line and the first portion extends along a line at an angle of approximately 45° to the first line between the first edge and first point.

DETAILED DESCRIPTION OF THE PREFERRED EMBODIMENT

Figure 1:
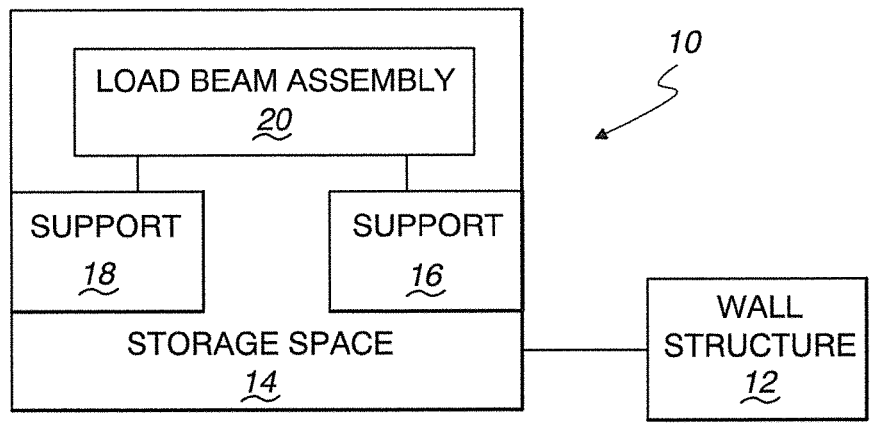
FIG. 1 is a schematic representation of a storage unit into which a prior art load beam assembly is incorporated, and which is suitable for incorporation of a load beam assembly, according to the invention.

In FIG. 1, a generic environment for the present invention is shown in the form of a storage unit at 10. The storage unit 10 has a wall structure 12 bounding a storage space 14 for the placement of objects to be stored. Within the storage space 14, a plurality of spaced supports 16, 18 is provided. The supports 16, 18 engage one known form of load beam assembly 20 to maintain the load beam assembly 20 in an operative position within the storage space 14, as shown additionally in FIGS. 2-5 and described hereinbelow.

The generic showing of the storage unit 10 is intended to encompass a number of different structures in different environments in which the load beam assembly 20, and inventive load beam assembly 20', as described hereinbelow, have application. For example, the storage unit 10 may be one that is stationary or one that is transportable, such as the exemplary form described hereinbelow.

Figure 2:
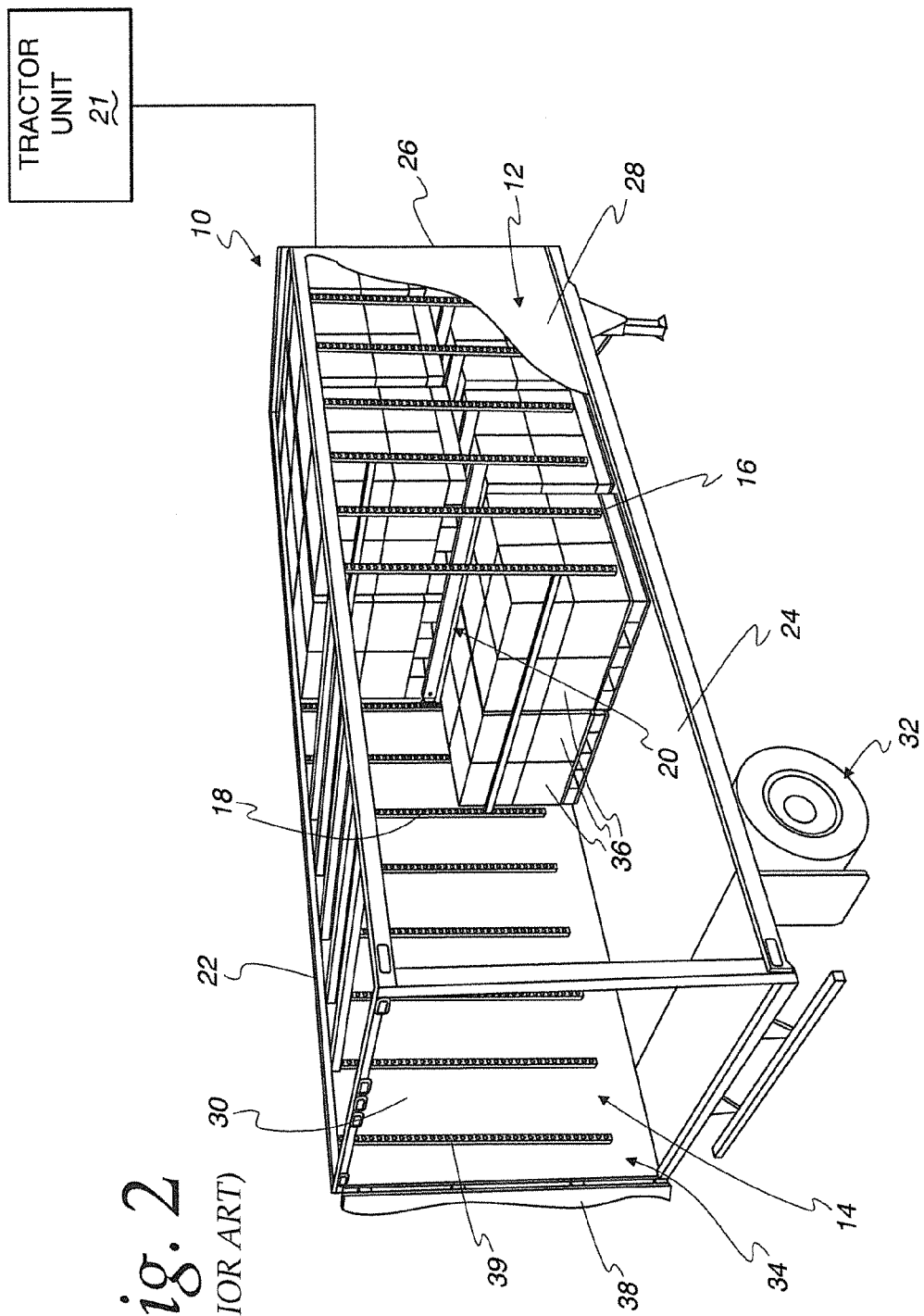
FIG. 2 is a partially broken away, perspective view of a specific form of storage unit in the form of an over-the-road trailer and with prior art load beam assemblies shown operatively mounted within a storage space therewithin.

In FIG. 2, one specific form of storage unit 10 is shown in the form of a trailer that is drawn by a tractor unit 21, with the combination making up what is conventionally identified as a tractor-trailer.

The storage unit 10 has the aforementioned wall structure 12, which is made up of a roof/top wall 22, a floor 24, a front wall 26, and spaced side walls 28, 30 that collectively bound the storage space 14. A wheeled chassis 32 supports the rear region of the storage unit/trailer 10. A rear access opening 34 allows objects 36 to be directed into and removed from the storage space 14. The access opening is selectively blocked by a pair of doors 38 (portion of one shown).

The supports 16, 18 for the load beam assembly 20 are provided on opposite side walls 16, 18, respectively in paired relationship at regular intervals in a fore-and-aft direction.

Each of the supports 16, 18 has the same construction and is in the form of an elongate, vertically extending track with openings 39 at regular intervals along the lengthwise extent thereof.

Figure 3:
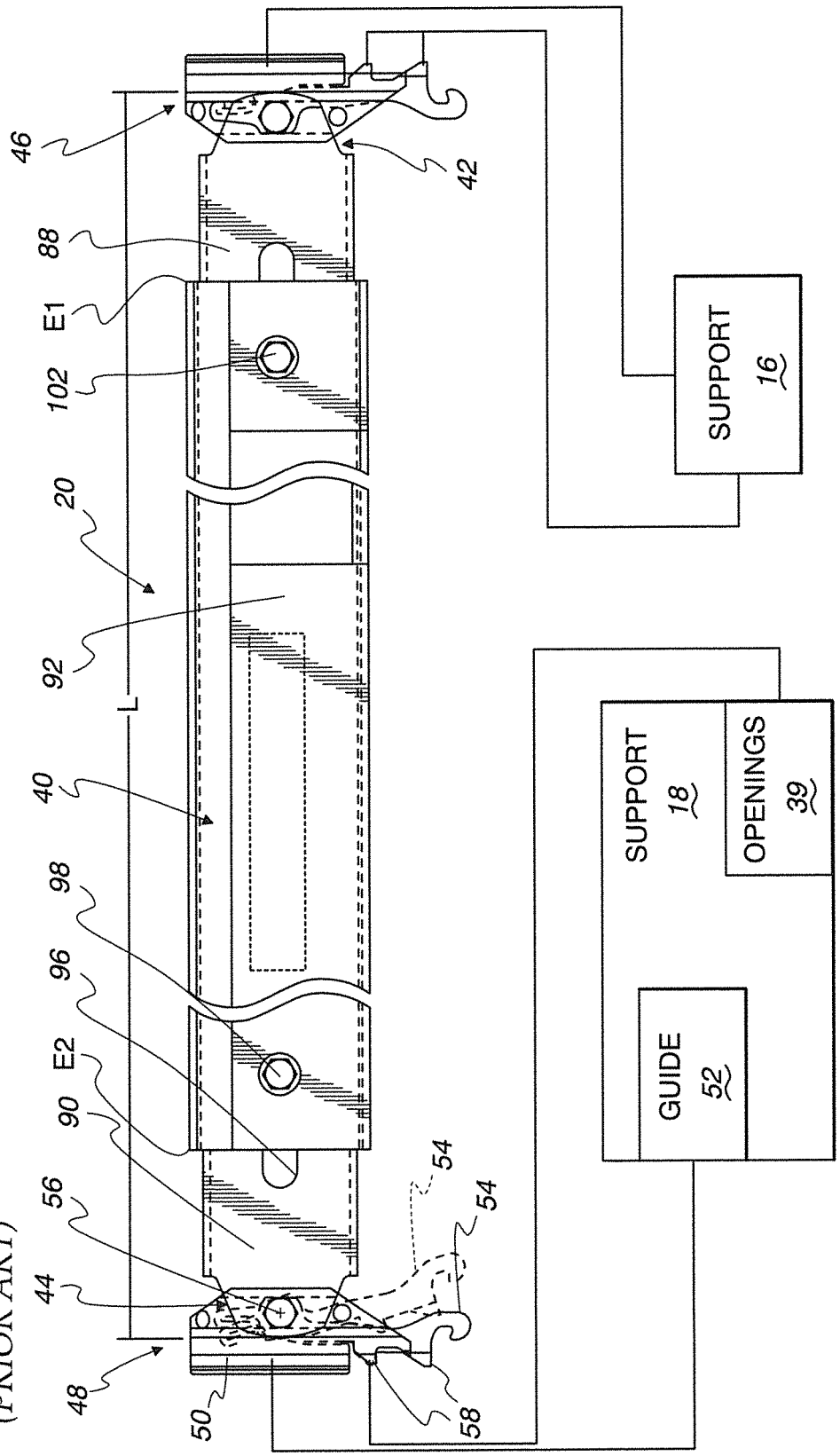
FIG. 3 is a side elevation view of one of the load beam assemblies in FIG. 2.
Figure 5:
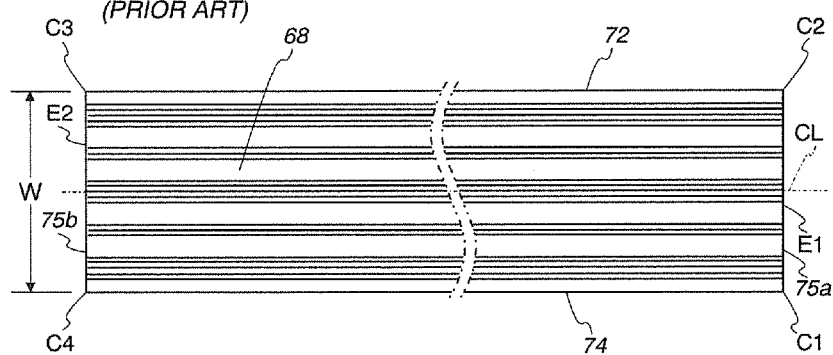
FIG. 5 is a plan view of one piece on the load beam assembly in FIG. 4.

The load beam assembly 20, as seen most clearly in FIG. 3, consists of an elongate beam 40 having a length L between spaced first and second ends 42, 44 and a transverse width W.

A first connector 46 connects the first end 42 of the elongate beam 40 to the support 16. A second connector 48 connects the second end 44 of the elongate beam 40 to the support 18.

The connectors 46, 48 have the same construction. The precise construction of the connectors 46, 48, and their interaction with the supports 16, 18, is not critical to the present invention.

The interaction between the elongate beam 40 and supports 16, 18 may be, for example, as depicted in either U.S. Pat. No. 6,364,583 or U.S. Pat. No. 6,074,143. The disclosure in each of these patents is incorporated herein by reference.

In a preferred form, the exemplary connector 48 has a guide shoe 50 that interacts with a guide 52 on the support 18. Preferably, the shoe 50 and guide 52 interact to allow the shoe 50 to be moved guidingly in translation along the vertical length of the support 18. This may be accomplished by providing at least one slot on one of the guide shoe 50 and guide 52, and at least one rail on the other of the guide shoe 50 and guide 52, that interact as shown in U.S. Pat. No. 6,074,143.

The guide shoe 50 supports a locking arm 54 that is pivotable relative to the guide shoe 50 around an axis 56. The locking arm 54 is movable between a locked position, as shown in solid lines in FIG. 3, and a released position, as shown in dotted lines. In the locked position, a pair of lugs 58 extends into the openings 39 in the support 18 at the desired vertical location. By repositioning the locking arm 54 to the released position, the guide shoe 50 can be moved to another vertical location.

It should be understood that the ability to adjust height is not critical to the present invention. Further, the connectors 46, 48 may interact with supports that are elongate in a horizontal direction with fore-and-aft adjusting capability.

Figure 4:
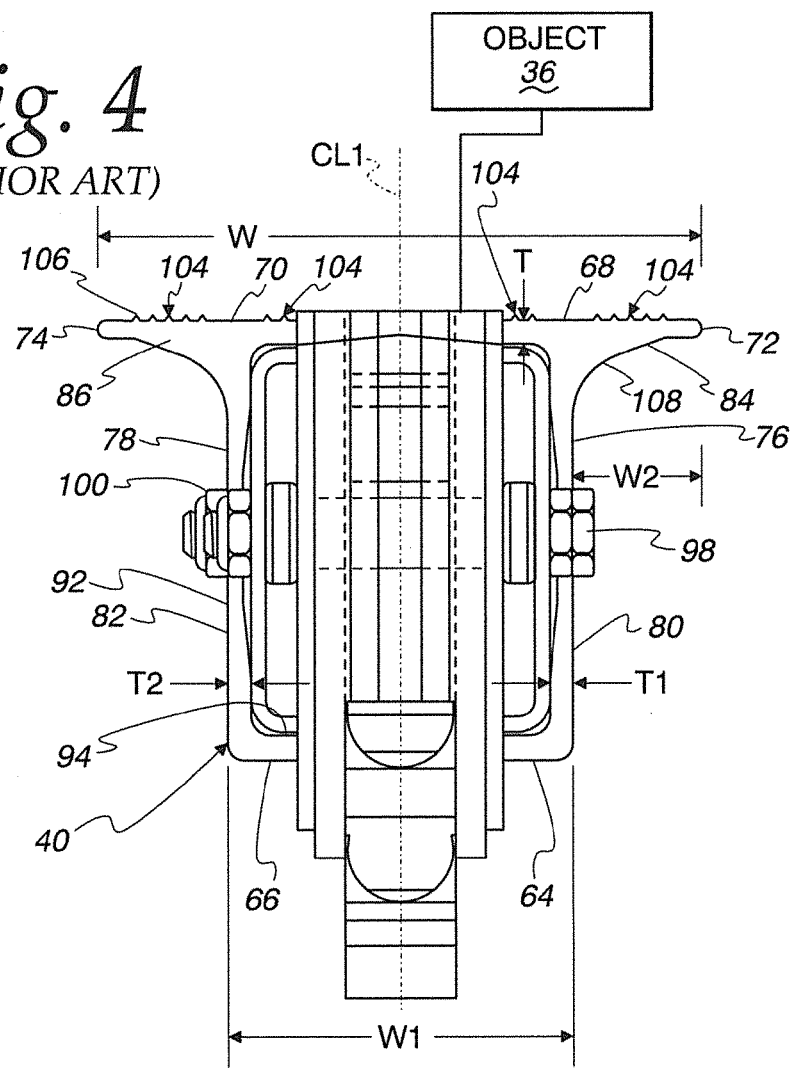
FIG. 4 is an enlarged, end elevation view of the load beam assembly in FIG. 3.

The elongate beam 40 has a bottom wall 64 with a downwardly facing surface 66 with a width W1. The elongate beam 40 further has a top wall 68 having an upwardly facing surface 70. The top wall 68 and upwardly facing surface 70 have a corresponding width W between laterally spaced first and second side edges 72, 74. The side edges 72, 74 are generally parallel to each other and the length of the elongate beam 40 on opposite sides of a lengthwise center line CL for the top wall 68. The top wall 68 has a thickness T, as indicated in FIG. 4, and first and second lengthwise ends E1, E2 at which edges 75a, 75b are respectively defined. The end edges 75a, 75b are substantially straight fully between the side edges 72, 74, with the lines thereof substantially orthogonal to the center line CL.

The elongate beam 40 further has a wall assembly below the top wall 68 and made up of laterally spaced first and second side walls 76, 78 with oppositely facing, substantially flat surfaces 80, 82, respectively. Each of the side walls 76, 78 has a thickness T1, T2, respectively.

The cross-sectional shape of the elongate beam 40 is symmetrical about a widthwise center line CL1, although this is not a requirement. A description of one exemplary side of the elongate beam 40 is made hereinbelow.

More specifically, the top wall 68 projects in cantilever fashion laterally beyond the flat surface 80 on the first side wall 76 to define a first flange 84 with a width W2 between the flat surface 80 and the side edge 72.

The flange 84 is locally thickened over a majority of the width W2. More preferably, as shown, this thickening is over substantially the entire width W2.

A flange 86 of the same shape is formed on the opposite side of the elongate beam 40 and projects oppositely to the direction of projection of the flange 84. Both of the flanges 84, 86 are preferably unsupported over their entire lengthwise extent in their respective regions between: a) the side wall surface 80 and side edge 72; and b) side wall surface 82 and side edge 74.

The width W of the upwardly facing surface 70 is greater than the width W1 of the downwardly facing surface 66. The objects 36 are supported upon the upwardly facing surface 70.

The depicted elongate beam 40 is made with a plurality, and in this case three, separate, telescopingly engaged parts. Separate side parts 88, 90 telescopingly engage a central part 92 that is described hereinabove. It is conceivable that as few as two parts can make up the elongate beam 40, with potentially greater than three parts defining its overall length.

The central part 92 has a single piece that defines the bottom wall 64, the top wall 68, and side walls 76, 78, including the flanges 84, 86. These components cooperatively define a through opening 94 of substantially rectangular cross-sectional shape to accommodate the surrounded side parts 88, 90 that have a complementary shape and move guidingly therewithin.

The interaction of the central part with the separate side parts 88, 90 is the same. Exemplary side part 90 has an elongate slot 96 extending lengthwise thereof to receive a bolt 98 that is directed horizontally through the side wall 76, the slot 96, and the opposite side wall 78, at which it is secured by a nut 100. With the combined effective length of the parts 88, 90, 92 selected, the bolt 98 is tightened, as is a bolt 102 that is used to fix the relationship between the central part 92 and side part 88.

As seen particularly in FIG. 4, the elongate beam 40 has a "T" shape as viewed in cross-section transverse to the length thereof. The overall length of the central part 92 is nominally matched to the widthwise spacing between the supports 16, 18. The side parts 88, 90 are moved relative to the central part 92 to make fine lengthwise adjustments. Normally, only a minimal length of the side parts 88, 90 is exposed, whereby it is not critical that the upper surfaces of these side parts 88, 90 be constructed in any particular manner to engage the objects 36.

To avoid shifting of the objects 36 that are supported, principally if not entirely, by the central part 92, the upwardly facing surface 70 is modified by providing texturing 104 at spaced widthwise locations. The texturing may take any conventional form and is shown as a series of elongate projections/ribs 106.

The local thickening of the flanges 84, 86 provides enough rigidity that there is no significant deflection that occurs under load. This makes possible the use of simply the cantilevered flange arrangement without requiring any underlying support therefor.

More specifically, the exemplary flat surface 80 on the side wall 76 is contiguous with a concave surface 108 over a majority of the width W2 of the flange 84. More preferably, the surface 108 curves continuously substantially fully between the flat surface 80 and the side edge 72.

The spacing between the flat sidewall surfaces 80, 82 is substantially constant, as identified by the width W1. The width W2, while not required to be so limited, is preferably less than one half the width dimension W1.

In FIGS. 6-9, an elongate beam, according to the invention, is shown at 40'. The elongate beam 40' has the same general construction as the elongate beam 40, and functions in cooperation with the aforementioned conventional load beam assembly components, and environmental components, in the same manner, with the exception that a top wall 68' on a central part 92', corresponding to the top wall 68 on the central part 92 of the elongate beam 40, is modified, specifically at spaced, lengthwise ends 120, 122 at which there are edges 75a', 75b', respectively. The identical beam side parts 88, 90, described above, can be used with the central beam part 92' to make up the elongate beam 40'.

Whereas the edges 75a, 75b on the elongate beam 40 are substantially straight fully between the side edges 72, 74 on the elongate beam 40, and orthogonal to the lengthwise center line CL, at least one, and preferably both, of the edges 75a', 75b' have at least a portion that does not extend orthogonally to the lengthwise center line of the top wall 68' between the edges 75a', 75b'. Preferably, that portion resides at at least one of the corner locations, as designated as C1, C2, C3, C4 in FIG. 5, where the edges 72, 74 meet with the edges 75a, 75b.

Figure 6:
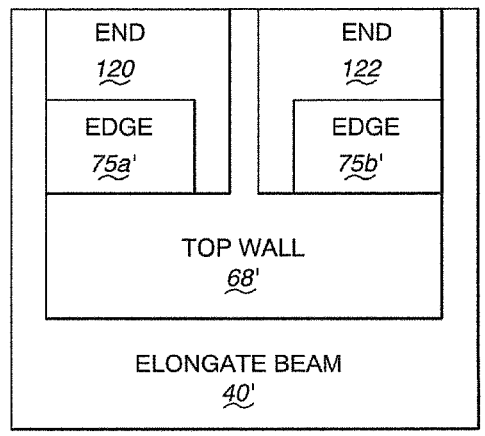
FIG. 6 is a schematic representation of an elongate beam, according to the present invention, that can be utilized with parts of the prior art structures in FIGS. 1-5 to define a load beam assembly.
Figure 7:
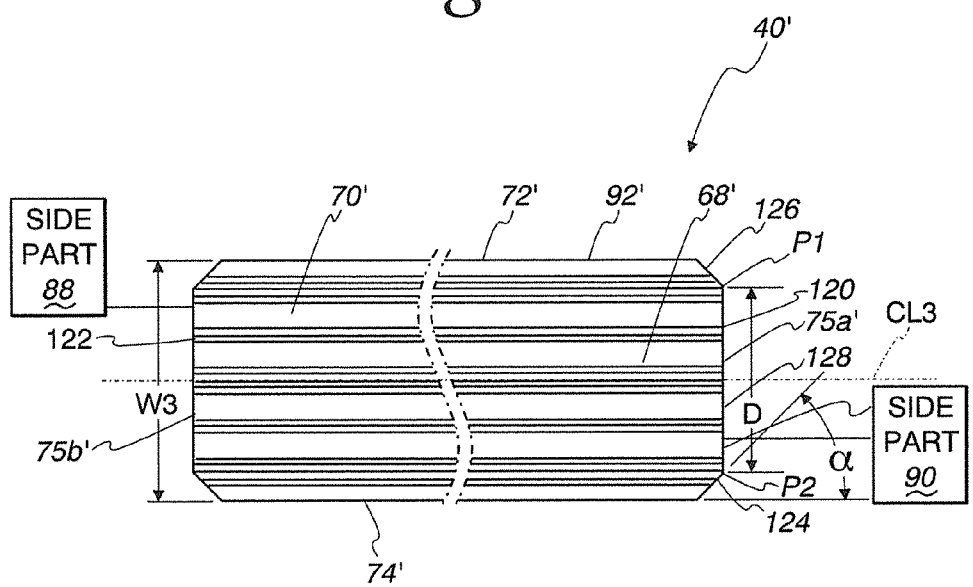
FIG. 7 is a plan view of one specific form of the inventive load beam assembly, shown in FIG. 6.
Figure 8:
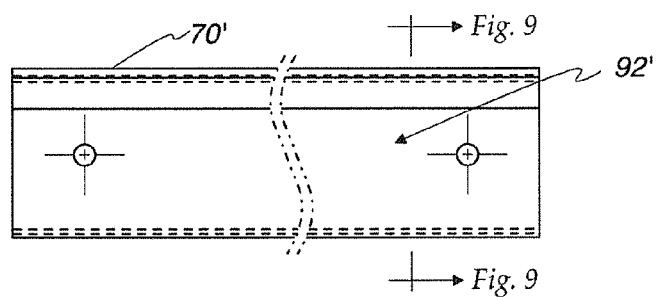
FIG. 8 is a side elevation view of part of the elongate beam on the load beam assembly in FIG. 7.
Figure 9:
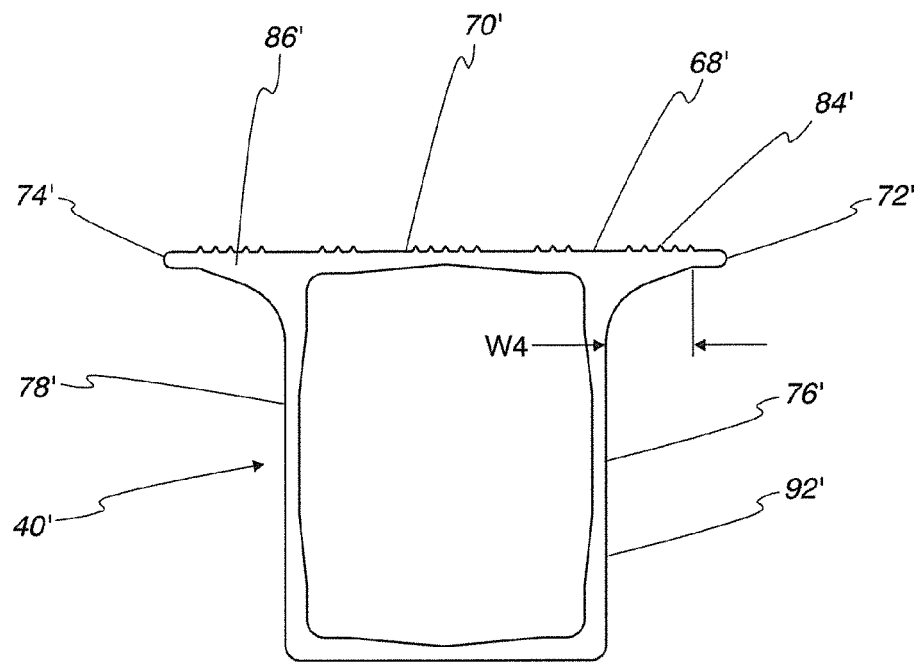
FIG. 9 is an enlarged, cross-sectional view of the part of the elongate beam taken along line 9-9 of FIG. 8.

The schematic showing of the elongate beam structure in FIG. 6 is intended to encompass virtually an unlimited number of edge configurations other than that in the exemplary form, described below.

The elongate beam 40' has the same general construction as the elongate beam 40, to include a wall assembly below the top wall 68' and made up of laterally spaced side walls 76', 78'. The schematic showing of the elongate beam 40' in FIG. 6 is intended to encompass a "T"-shaped construction, as shown generally in FIG. 9, wherein the stem of the "T" is made by a single layer, or different arrangement of sidewalls.

The top wall 68', and upwardly facing surface 70' thereon, have a width W3 between side edges 72', 74'. The side edges 72', 74' are substantially straight, parallel to each other, and equally spaced from, and parallel to, a lengthwise center line CL3.

As in the prior embodiment, the top wall 68' extends in cantilever fashion away from the wall assembly to define flanges 84', 86', respectively extending to the edges 72', 74'.

In this embodiment, the edges 75a', 75b' have the same configuration. The exemplary edge 75a' has three distinct portions 124, 126, 128, with the portions 124, 126 corresponding to the portions, mentioned above, that do not extend orthogonally to the center line CL3.

The edge portion 124 is defined where the edge 75a' extends away from the edge 74', with the edge portion 126 defined where the edge 75a' extends away from the edge 72'. The edge portion 128 is substantially straight and extends in a line orthogonal to the center line CL3 over a distance D between separate points P1, P2. The edge portion 124 extends directly between the edge 74' and the point P2, with the edge portion 126 extending directly between the edge 72' and the point P1.

In this embodiment, the edge portions 124, 126 are substantially straight and extend in lines that are at the same angle with respect to the center line CL3. More specifically, for exemplary edge portion 124, the line of the edge 124 makes an angle α with respect to the center line CL3 and line of the edge 74' that is approximately 45°. This angle generally might be variable within a range of 5°-15° from the 45° angle depicted. The precise angle is not critical, nor must the edge portions be straight.

The opposite edge 75b' has substantially the same configuration as the edge 75a'.

It should be understood that the precise configuration of the edges 75a', 75b', within the scope of the generic showing in FIG. 6, could vary significantly. These edge portions may be rounded, each formed by multiple straight segments, etc. Further, the portion 128 need not be straight and could be curved, or otherwise configured, as by a series of short edge portions.

In other respects, the center section 96' on the elongate beam 40' is similar to the center section 96 on the elongate beam 40, with the flanges 84', 86' extending in cantilever fashion away from the wall assembly, and with the flanges being locally thickened. The exemplary flange 84' is locally thickened over a width W4, with the point P1 located to coincide with the locally thickened flange region.

The foregoing disclosure of specific embodiments is intended to be illustrative of the broad concepts comprehended by the invention.

The invention claimed is:

1. A load beam assembly configured to be received within a wall structure with a plurality of spaced supports, comprising:
    an elongate beam having a length between spaced first and second ends;
    a first connector for connecting the first end of the elongate beam to one of the spaced supports upon the wall structure; and
    a second connector for connecting the second end of the elongate beam to another of the spaced supports upon the wall structure,
    wherein the elongate beam comprises: i) a top wall having an upwardly facing surface with a width between laterally spaced first and second edges extending generally parallel to the length of the elongate beam; and ii) a wall assembly below the top wall and having oppositely facing first and second surfaces,
    the upwardly facing surface having a lengthwise centerline between the first and second edges, the top wall extending in cantilever fashion away from the wall assembly to define a first flange extending to the first edge, wherein the top wall has first and second lengthwise ends defined by third and fourth edges, wherein the third edge has at least a first portion that does not extend orthogonally to the lengthwise centerline of the top wall between the first and second edges; and
    the upwardly facing surface configured to receive at least one stored object supported thereon.

2. The load beam of claim 1 wherein the fourth edge has at least a second portion that does not extend orthogonally to the lengthwise centerline of the upwardly facing surface between the first and second edges.

3. The load beam of claim 1 wherein the at least first portion is defined where the third edge extends away from one of the first and second edges.

4. The load beam of claim 1 wherein the at least first portion is defined separately where the third edge extends away from each of the first and second edges.

5. The load beam of claim 1 wherein a portion of the third edge extends orthogonally to the lengthwise centerline of the upwardly facing surface between the first and second edges over a distance between first and second points.

6. The load beam of claim 5 wherein the at least first portion extends directly between the first edge and the first point.

7. The load beam of claim 6 wherein the at least first portion extends directly between the second edge and the second point.

8. The load beam of claim 6 wherein the first flange is locally thickened over a first width of the first flange and the first point is on the first flange where the first flange is locally thickened.

9. The load beam of claim 6 wherein the first edge is substantially straight and extends along a first line and the first portion extends along a line at an angle of approximately 45° to the first line between the first edge and first point.

10. The load beam of claim 7 wherein the at least first portion extending directly between the first edge and the first point is substantially straight.

11. The load beam of claim 10 wherein the at least first portion extending directly between the second edge and second point is substantially straight.

12. The load beam of claim 1 wherein the fourth edge has a portion that does not extend orthogonally to the lengthwise centerline between the first and second edges.

13. The load beam of claim 1 wherein the storage unit is a wheeled trailer.

14. The load beam of claim 1 wherein the first connector comprises a shoe that is configured to be guided by a first track upon one of the spaced supports with the first connector being selectively fixable at different locations along the first track.

15. The load beam of claim 1 wherein the elongate beam comprises a bottom wall with a downwardly facing surface with a width transversely to the length of the elongate beam, wherein the width of the upwardly facing surface of the elongate beam is greater than the width of the downwardly facing surface of the elongate beam.

16. The load beam of claim 1 wherein the top wall extends in cantilever fashion away from the wall assembly to define a second flange that extends to the second edge.

17. The load beam of claim 1 wherein the elongate beam comprises telescopingly engaged first and second parts, where the first part comprises the top wall and the wall assembly below the top wall and furthering comprising a void defined within the wall assembly, wherein the second part is slidably received within the void.

18. The load beam of claim 1 wherein the elongate beam has a "T" shape as viewed in cross section transverse to the length of the elongate beam.

19. The load beam of claim 1 wherein the fourth edge has at least a portion that does not extend orthogonally to the lengthwise centerline of the upwardly facing surface between the first and second edges.

20. The load beam of claim 1 wherein the third and fourth edges have the same configuration.

* * * * *